US006311645B1

(12) United States Patent
Brown

(10) Patent No.: US 6,311,645 B1
(45) Date of Patent: Nov. 6, 2001

(54) ANIMAL TRAINING METHOD AND APPARATUS

(76) Inventor: Joseph S. Brown, 120 Laurel Rd., Lewistown, PA (US) 17044

(*) Notice: Subject to any disclaimer, the term of this patent is extended or adjusted under 35 U.S.C. 154(b) by 0 days.

(21) Appl. No.: 09/847,822

(22) Filed: May 3, 2001

(51) Int. Cl.[7] .................... A01K 29/00
(52) U.S. Cl. .................... 119/712; 119/905
(58) Field of Search .................... 119/174, 905, 119/908, 712, 720, 836, 850; 54/86.2

(56) References Cited

U.S. PATENT DOCUMENTS

| | | | |
|---|---|---|---|
| 773,291 | 10/1904 | Lindenberg . | |
| 1,550,547 | 8/1925 | Jurey . | |
| 1,925,928 | 9/1933 | Masbruch | 119/104 |
| 3,942,270 | 3/1976 | Hoyt et al. | 35/12 N |
| 4,021,935 | 5/1977 | Witt | 35/12 G |
| 4,106,217 | 8/1978 | Witt | 35/12 B |
| 4,152,846 | 5/1979 | Witt | 35/12 B |
| 4,261,293 | 4/1981 | Djernes | 119/15.5 R |
| 4,283,177 | 8/1981 | Kron et al. | 434/59 |
| 5,308,246 | 5/1994 | Balocco | 434/236 |
| 5,732,415 * | 3/1998 | Boyd | 119/836 |
| 5,841,507 | 11/1998 | Barnes | 351/49 |
| 5,868,104 * | 2/1999 | Ramirez | 119/850 |
| 6,052,097 | 4/2000 | Duncan et al. | 343/788 |
| 6,200,585 * | 3/2001 | Voelz | 119/712 |

* cited by examiner

*Primary Examiner*—Thomas Price
(74) *Attorney, Agent, or Firm*—Thomas Hooker, P.C.

(57) ABSTRACT

A humane, pain-free method of animal training includes interrupting the animal's vision to deliver a training stimulus. A lens having an electro-optic shutter is placed within the animal's field of vision. The shutter is open and does not obstruct or interrupt the animal's vision while the animal exhibits desirable behavior. The shutter is closed and interrupts the animal's vision to deliver a training stimulus as needed. The closed shutter is re-opened to remove the training stimulus and continue training.

19 Claims, 3 Drawing Sheets

20
12
10
14
16
18
24
22
36
42
38

14
26
36
34
32
40
28
42
30
38
44

50
80
82
78
84
66
62
68
56
76
58
72
74
70
64
52

72
62
54
66
76
78
68
86
82
84
58
62
56

ANIMAL TRAINING METHOD AND APPARATUS

FIELD OF THE INVENTION

The invention relates to an animal training method and an apparatus for carrying out the method.

BACKGROUND OF THE INVENTION

There are many animal training methods in use today. Conventional training methods apply some form of unpleasant or negative stimulation, such as a loud or uncomfortable sound, to train the animal. Negative stimulation is not very effective when used alone and so it is usually coupled with painful stimulation as a training reinforcement. Typical forms of painful simulation include vibrations, electric shock or even choking the animal. These stimuli rely on pain and fear to teach the animal desired behavior. Such painful stimulation can confuse the animal, break the animal's spirit and is unsuitable for many training regimes. In inexperienced hands such training can even approach animal cruelty.

Thus there is a need to replace conventional animal training methods with an improved, more humane training method. The improved method should not apply negative or painful stimuli, nor rely on pain and fear to teach desired animal behavior. The method should be usable in a wide variety of animal training regimes.

SUMMARY OF THE INVENTION

The invention is a humane, pain-free animal training method. The method does not apply negative or painful stimuli to the animal and does not rely on pain or fear to teach desired behavior. The method may be used to train dogs, horses and other trainable animals, and is usable in a wide variety of animal training regimes.

It has been found that a temporary interruption of an animal's vision can be used as a training stimulus. During training, the animal's vision or field of view is temporarily obstructed or interrupted. The animal may at first be initially confused, but quickly becomes accustomed to having its vision interrupted. The interruption is not painful and does not scare the animal.

The steps of an animal training method having features of the present invention include attaching a light valve to the animal within the animal's field of vision. A light valve is a device that has an open, transparent state which allows light transmission through the valve and a closed, opaque state which substantially reduces or eliminates light transmission through the valve. The valve is kept open and does not obstruct or interrupt the animal's vision while the animal exhibits desirable behavior. The light valve is closed and obstructs or interrupts the animal's vision to deliver a training stimulus. The light valve is re-opened to remove the stimulus and restore the animal's vision for continued training.

In preferred embodiments of the method the step of opening or closing the light valve includes applying a voltage differential across an electro-optic material. Such materials change between opened and closed states in response to an applied voltage differential across them. Conventional electro-optic materials include liquid crystals and light polarizing filters.

An animal training apparatus for practicing the method of the present invention includes spectacles having a lens and an attachment member for holding the lens in the field of view of the animal. The lens preferably includes an electro-optic shutter, that is, a shutter formed from an electro-optic material. A voltage source generates a voltage differential and circuitry connected between the voltage source and the shutter applies the voltage differential to open or close the shutter. The circuitry includes a switch that selectively opens or closes the circuit to enable the trainer to apply the training stimulus when needed. The switch can be actuated by a remote control device held by the trainer.

Other objects and features of the invention will become apparent as the description proceeds, especially when taken in conjunction with the accompanying drawings illustrating animal training apparatus of the present invention, of which there are three sheets of two embodiments.

DESCRIPTION OF THE PREFERRED EMBODIMENTS

Figure 1:
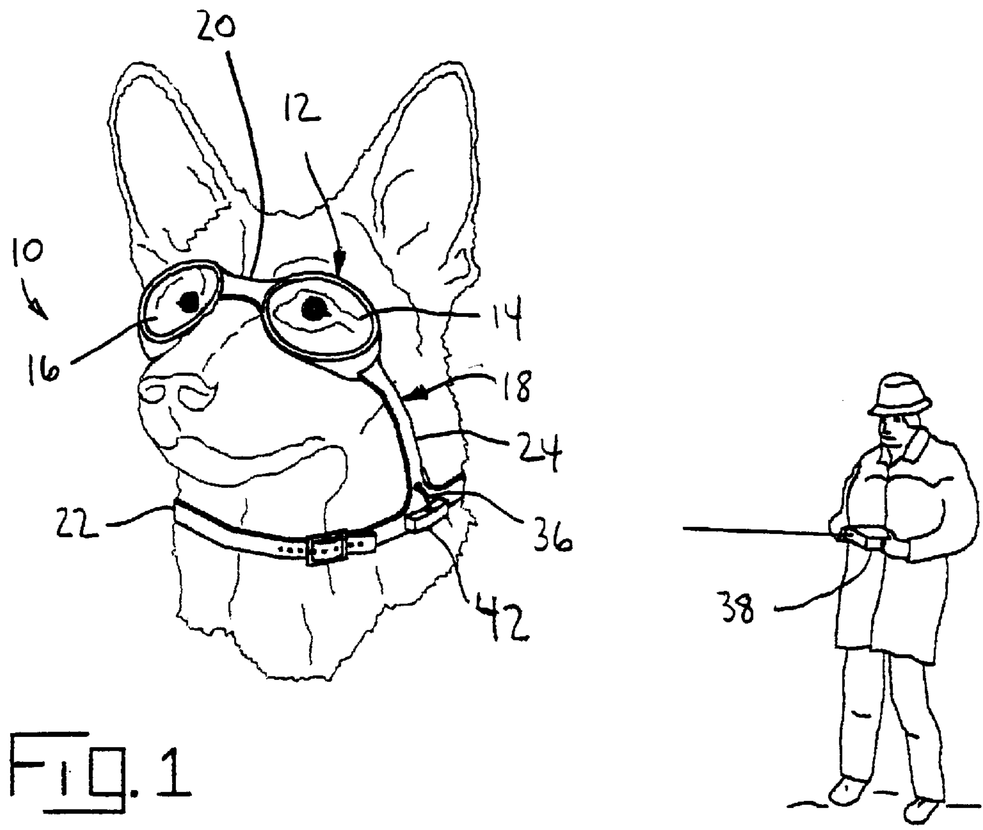
FIG. 1 is a perspective view of a first embodiment animal training apparatus of the present invention, the spectacle lenses in an open, transparent state.
Figure 2:
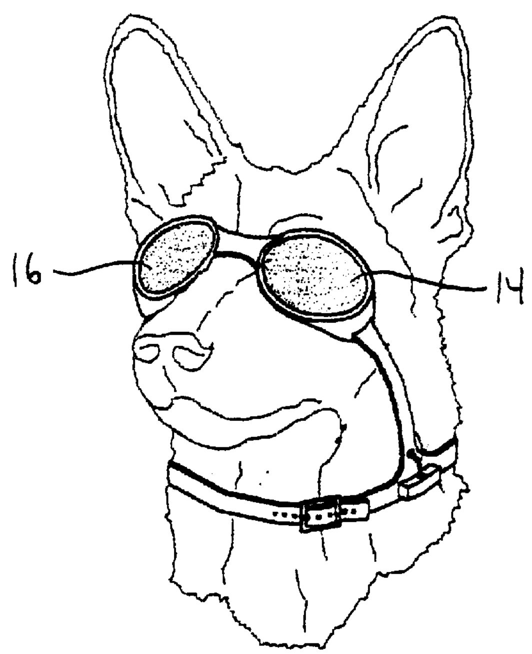
FIG. 2 is similar to FIG. 1 but illustrates the spectacle lenses in an opaque, closed state.
Figure 3:
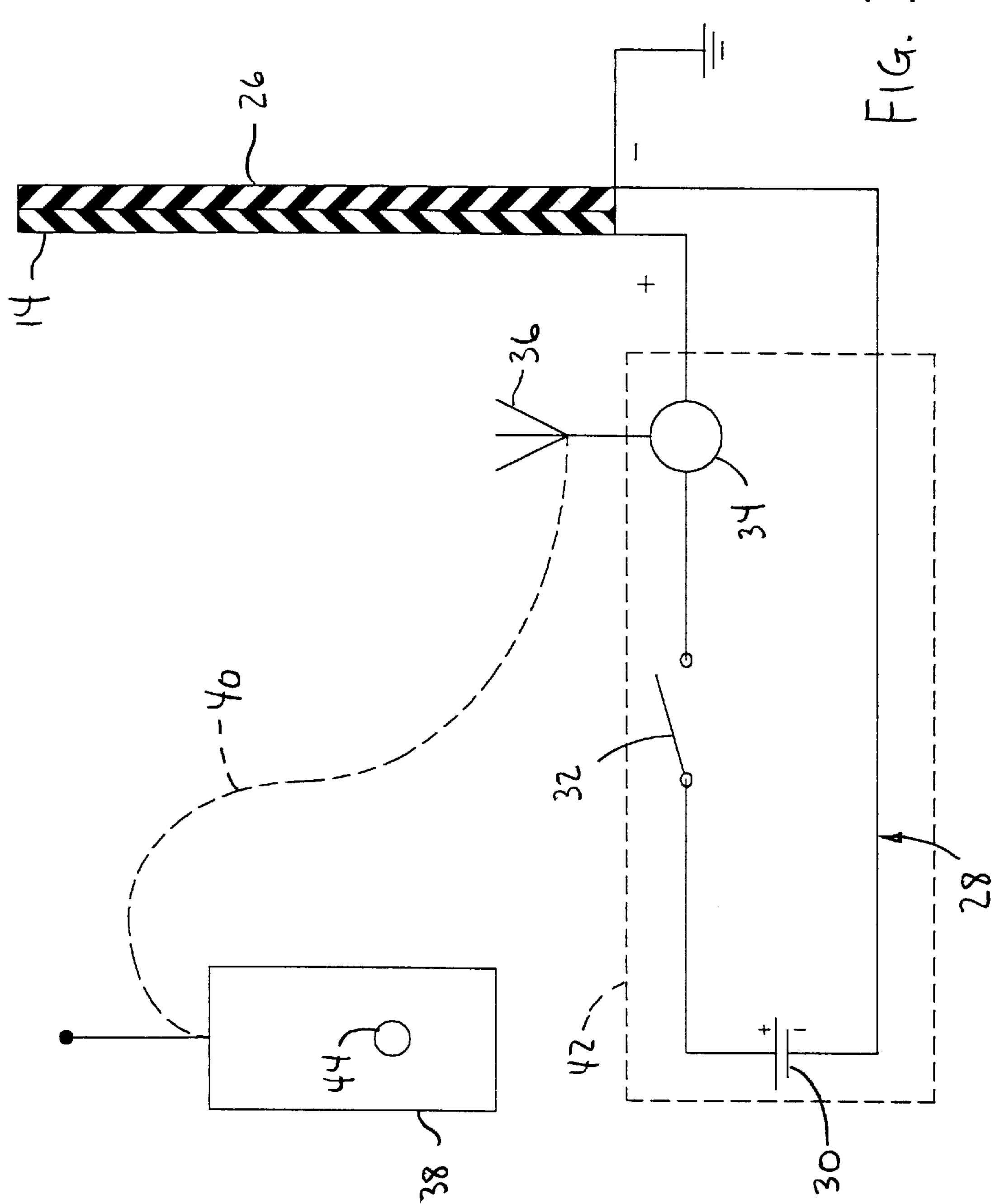
FIG. 3 is a schematic diagram of the circuitry of the animal training apparatus shown in FIG. 1.

FIGS. 1–3 illustrate a first embodiment animal training apparatus 10 in accordance with the present invention. The apparatus 10 is shown on a dog, it being understood that the apparatus can be readily adapted for training other breeds of dogs and other trainable animals.

Animal training apparatus 10 includes spectacles 12 with a pair of lenses 14, 16 in front of the dog's left and right eyes respectively. The spectacles include an attachment member 18 holding the lenses in position within the dog's field of view. The attachment member 18 includes a frame 20 housing the lenses. In the illustrated embodiment the frame 20 seals the outer periphery of the eyes so that the dog's entire field of vision is defined by the lenses. An adjustable collar 22 fastens the spectacles securely about the dog's neck. A pair of lens straps 24 extend from the collar to opposite sides of the frame 20 and hold the frame in place against the dog's face. The lens straps or frames may also include adjustment features to position the lenses on different sizes or breeds of dog.

The lenses 14, 16 are each made from a liquid crystal material that forms an electro-optic light valve or shutter 26 (see FIG. 3). The shutter can switch between an open, transparent state and a closed, opaque state by applying a voltage differential across the material. Preferably the shutter is in a transparent state when no voltage differential is applied so that the shutter is normally open. The liquid crystal material is conventional and will not be described in further detail. A control circuit 28 electrically connects both lens shutters 26 with a battery or voltage source 30 to close the shutters.

FIG. 3 illustrates in schematic form the control circuit 28 extending to the lens 14, it being understood that the voltage differential is applied and removed from the lenses 14, 16 simultaneously. The circuit 28 includes a normally open switch 32 that closes to complete the circuit. When the switch is closed the circuit applies the voltage differential generated by voltage source 30 across the shutters.

The switch 32 is controlled by a control relay 34 operatively connected to an antenna 36. A remote control device 38 transmits a microwave radio signal that is received by the antenna to actuate the relay and close the switch. The remote control 38 shown is separate from and not physically connected to the other components of the animal training apparatus. In other possible embodiments the control relay could be actuated by sound waves, infrared light or the like transmitted by the remote control 38. Alternatively, the remote control device may be physically connected to the control relay by a signal cable 40 shown in dashed lines in FIG. 3. The cable 40 would preferably be incorporated into a leash attached to the collar to maintain physical control of the dog during a training session.

The voltage source 30, antenna 36 and other parts of the circuit 28 are housed in or mounted on a housing 42 attached to the collar 22. The circuit extends from the housing 42 to the shutters through the collar and lens straps.

Operation of the animal training apparatus 10 in carrying out is the method of the present invention will now be described. The training apparatus 10 is fitted to the dog with the lenses 14, 16 within the dog's field of vision as shown in FIG. 1. The lens shutters shown in the figure are in their open, transparent state and do not obstruct the dog's field of vision.

A training session is then conducted with the dog, with the trainer holding the remote control 38. The shutters remain open and do not obstruct the dog's vision while the dog exhibits desirable behavior. When it is necessary to deliver a training stimulus, the shutters 26 are closed by the trainer using the remote control 38. FIG. 2 illustrates the animal training apparatus 10 with the shutters of the lenses 14, 16 closed. The closed shutters obstruct and interrupt the dog's vision to deliver the training stimulus. The shutters are then reopened to remove the training stimulus and restore the dog's vision for continued training.

In the illustrated embodiment the remote control device includes a push button 44 which is pressed to emit the radio signal closing the shutter and pressed again to stop the signal transmission and open the shutter. The control relay 34 is responsive to the presence or absence of the radio signal and enables the trainer to control the length of time the training stimulus is applied. In other possible embodiments the control relay could close the lens shutters for a set time to deliver the training stimulus for a predetermined time period. Other control circuits or timing arrangements could be used.

Figure 4:
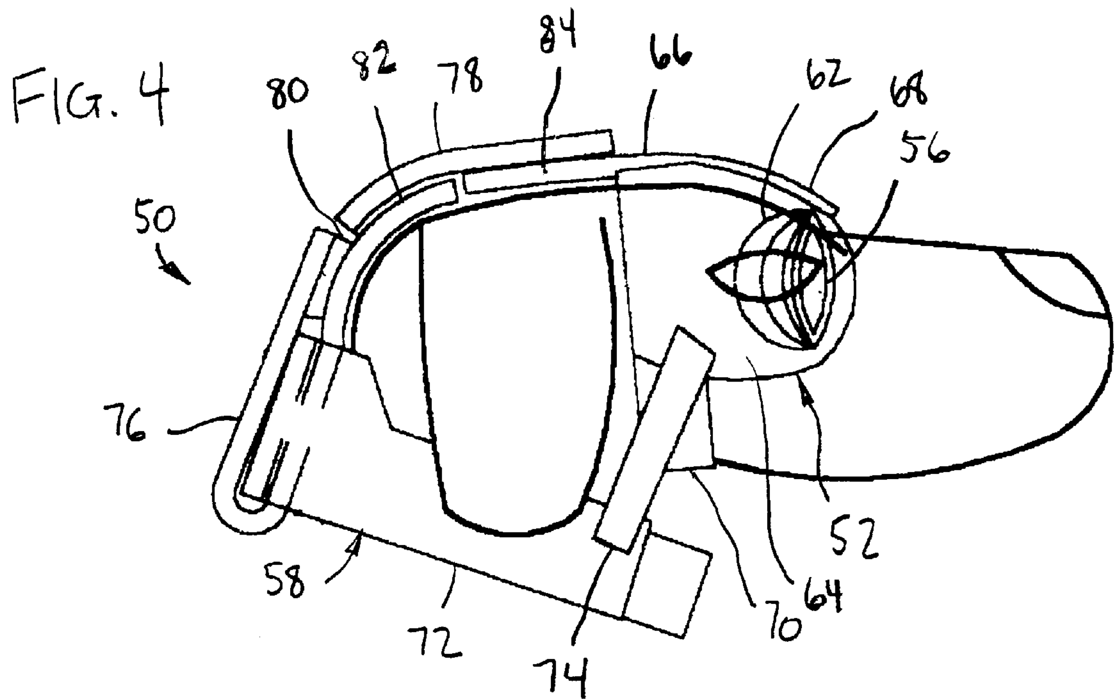
FIG. 4 is a top view of a second embodiment animal training apparatus of the present invention.
Figure 5:
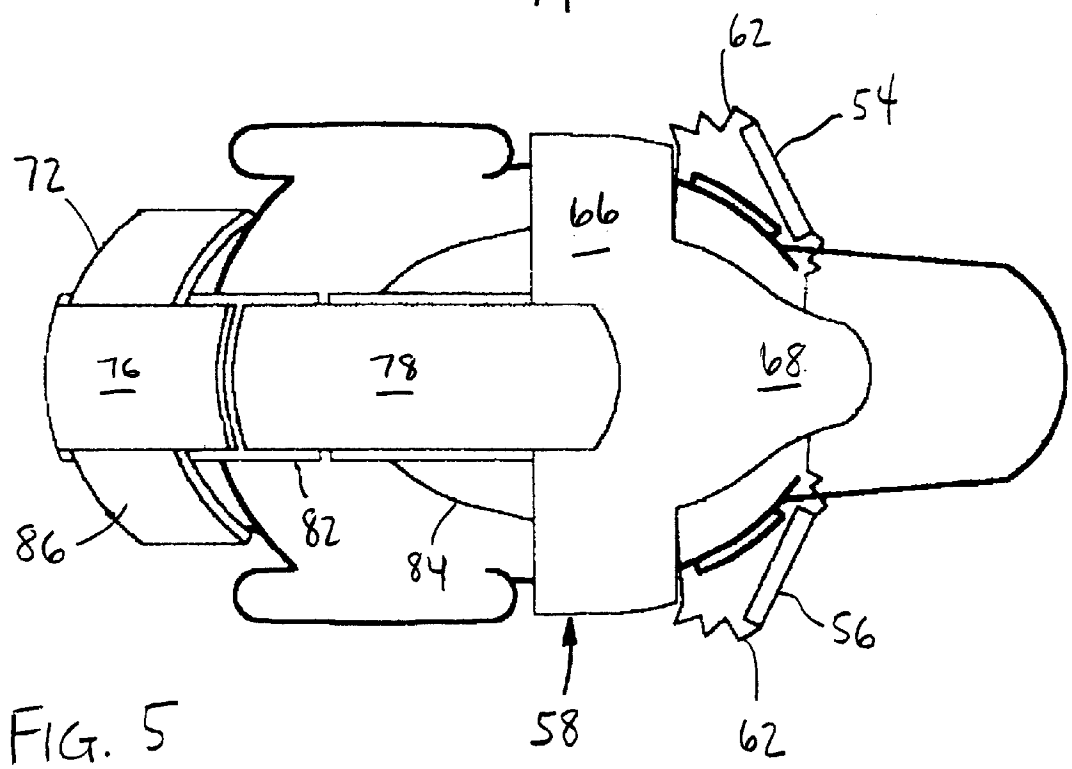
FIG. 5 is a side view of the animal training apparatus shown in FIG. 4.

FIGS. 4 and 5 illustrate a second embodiment animal training apparatus 50 in accordance with the present invention. The illustrated apparatus 50 is adapted to be worn on a dog, but could be readily adapted for use with other animals.

The apparatus 50 includes spectacles 52 having a pair of lenses 54, 56 in front of the dog's left and right eyes respectively and a hood-like attachment member 58 holding the lenses in position within the dog's field of view. To better illustrate how the spectacles fit the dog, the dog's eyes and forehead behind the spectacles are shown in FIGS. 4 and 5.

The attachment member 58 includes a frame 60 having a pair of flexible lens shrouds 62, each shroud housing a lens 54 or 56. Each shroud 62 surrounds one eye and limits the eye's field of vision to such lens. The shrouds 62 are carried in a flexible fabric goggle 64 attached to a stiff skullcap 66 that fits over the top of the dog's head. The skullcap 66 has an extension 68 that extends downwardly between the dog's eyes between the lens shrouds. A pair of chin straps 70 extend from the sides of the goggles and secure the goggle to the dog's head. The ends of the chin straps join together by a hook and loop fastener (not shown) and fit snuggly beneath the dog's lower jaw.

The attachment member 58 includes an adjustable collar 72 that fits around the neck of the dog. A pair of elastic goggle straps 74 extend from each side of the goggle 64 to the front of the collar and hold the goggle fabric taut. The skullcap 66 is attached to the rear of the collar 72 by primary and secondary skullcap straps 76, 78 respectively. The primary skullcap strap 76 is looped through the back of the collar and is secured by a hook and loop connection 80. The secondary strap 78 overlies a rearward extending tongue 84 on the rear of the skullcap 68 and extends towards the strap tongue 82. The straps 76, 78 and tongue 82 are preferably connected to one another by hook and loop fasteners to permit adjustment of the length of the straps as needed.

The lenses 54, 56 are each made from a pair of crossed polarizer material that forms an electro-optic light valve or shutter which operate like the shutters 26. Each polarizer allows only light polarized in one plane to be transmitted through the lens when a voltage differential is applied. A lens 54, 56 is made from a pair of polarizers arranged with perpendicular polarization planes. The polarizers cooperate with each other and block light transmission through the lens when actuated. The cross polarizers can be formed from a liquid crystal material as previously described.

A control circuit and batteries (each not shown) like the circuit 28 and voltage source 30 applies the voltage differential to the lenses. The batteries and control circuitry are housed in an enclosure or housing 86 formed in the collar. The collar can also mount an antenna (not shown) for actuation of the lens shutters by a remote control device like the device 38.

Although both illustrated embodiments 10, 50 have separate lenses for the animal's left and right eyes, in other embodiments the apparatus could include just one lens which is in the field of vision of both eyes.

The shutters of the illustrated embodiments stop transmission of substantially all light through the lens when closed. In other possible embodiments the light valves could allow some transmission of light when in the closed or opaque state. The light valves would block sufficient light to be perceived as a vision interruption by the animal and thereby deliver a training stimulus.

Examples of conventional training regimes and how such training regimes can be adapted to the method of the present invention are described next. These examples illustrate the wide adaptability of the invention and are not intended to limit the scope of the invention. The method and apparatus of the present invention are readily adaptable to the training of dogs, horses and other animals, and may be used in other training regimes.

EXAMPLE 1

"Whoa" Command Training

"Whoa" is the command for animal training. It is an integral part of most training regimens. The command starts the training session and terminates the session, and is a part of almost every new command sequence.

The whoa command is both corrective and protective. The animal must respond to the command to stop undesirable behavior or behavior which could even harm the animal. An old adage among dog trainers is "when the whoa command is given, a properly trained dog stops in mid-air."

Training an animal the whoa command using a negative stimulation method can, in some circumstances, harm the animal. The animal does not yet know the desired behavior, and negative stimulation applied when an animal is unsure of what to do can break the animal's spirit and render the animal untrainable. The pain and fear can even make the animal unfit as even a simple house pet.

When training an animal the whoa command using the method of the present invention, the animal does not experience negative stimulation, even when the animal has not yet learned the proper response to the command. The animal can be taught the whoa command without the risk of breaking the animal's spirit.

The interruption of the animal's vision also has the added benefit of stopping undesirable behavior without pain. The animal is thereby safer because the vision interruption will cause the animal to stop behavior that could cause it harm.

EXAMPLE 2

Puppy Training

When training a puppy, the puppy is conventionally placed on a bench and connected to an overhead wire. After obedience on the bench is established, the same commands must be taught on the ground and then reinforced around birds or game. The need to re-teach commands wastes time and puts a lot of pressure on the puppy. The pressure may be severe enough to have a deleterious effect on the puppy's spirit, and may even make the puppy unsuitable as a pet.

When trained in accordance with the method of the present invention, the puppy can be taught immediately on the ground. The puppy does not have to be initially restrained by a wire. The puppy will receive a much freer, less physically restrained introduction to working with the owner or trainer. The puppy's spirit will remain positive and the puppy will not become people-shy as a result of harsh training.

EXAMPLE 3

Herding or Chase Instinct of Dogs

Many dogs instinctively have the urge to herd or chase. Chasing other animals or vehicles is undesirable and often dangerous. Conventionally, drastic steps are taken to control such instinctive behavior. These included the use of an electric collar or squirting ammonia into the dog's face from a moving vehicle. The dog can now be stopped safely and trained painlessly by the animal training method of the present invention to modify the instinct to herd or chase.

EXAMPLE 4

Training Retrievers

Training a dog to retrieve game is taught in its first stages in a "hands-on" fashion. The trainer then moves farther and farther away from the actual retrieving exercise. The trainer's goal is to have the dog wait for the command to retrieve. But the dog has a natural instinct to retrieve the game immediately, and often painful stimuli would be applied to teach the dog to retrieve on command. This may cause the dog to "blink" game and go away from it for fear of receiving such painful, negative stimulation.

Vision interruption in accordance with the method of the present invention lends itself well to training retrievers. The vision interruption can keep the dog stationary until the fetch command is given and vision is restored. It can also be useful in shortening the time needed to teach multiple or directional retrieving in pointing and retrieving dogs.

EXAMPLE 5

Street Control

An animal training apparatus for the training method of the present invention also has value for street control of the animal. A dog is typically fitted with a muzzle and walked on a leash among pedestrians. If the dog breaks free of the leash, the dog could run into traffic or jump on a pedestrian. If the dog slips the muzzle, the dog might bite. With the apparatus of the present invention, the dog's vision can be interrupted to stop the dog until control of the dog is regained.

The training method of the present invention can be combined with other training stimuli, as for example, giving the animal a positive reinforcement after exhibiting desired behavior.

The animal training method and apparatus of the present invention enable the trainer to train an animal without painful or negative stimulation. If an animal can be trained without pain or fear, both the animal and the trainer will be happier. The animal will be well trained and well treated, and its spirit will remain whole. The trainer will not be even unintentionally cruel to the animal.

While I have illustrated and described preferred embodiments of my invention, it is understood that these are capable of modification, and I therefore do not wish to be limited to the precise details set forth, but desire to avail myself of such changes and alterations as fall within the purview of the following claims.

What I claim as my invention is:

1. A method of training an animal by delivering a pain-free training stimulus to the animal, the method comprising the steps of:

a) attaching a light valve to the animal within the animal's field of vision;

b) opening the light valve and not interrupting the vision of the animal while the animal exhibits desirable behavior;

c) closing the light valve and interrupting the vision of the animal to deliver a training stimulus; and d) opening the closed light valve to remove the training stimulus and restore the animal's vision for continued training.

2. The method of claim 1 wherein the light valve comprises an electro-optic light valve.

3. The method of claim 2 wherein the electro-optic light valve comprises a liquid crystal.

4. The method of claim 1 wherein the attaching step comprises the step of:

e) placing a lens in front of an eye of the animal.

5. The method of claim 1 wherein the closing step comprises the step of:

e) actuating a remote control device spaced away from the animal.

6. The method of claim 1 including the step of:

e) providing an additional training stimulus in addition to closing the light valve.

7. The method of claim 1 wherein the closed light valve does not remain closed for a predetermined time period.

8. The method of claim 5 wherein the animal is a dog or a horse.

9. An animal training apparatus for delivering a pain-free training stimulus to an animal comprising:

spectacles comprising a lens and an attachment member for holding the lens on the animal, the attachment member configured to hold the lens in the field of view of the animal;

the lens comprising an electro-optic shutter, the shutter having a substantially transparent state for light transmission through the lens and a substantially opaque state for reduced light transmission through the lens;

a voltage source for applying a voltage differential to the shutter and changing the shutter between transparent and opaque states;

circuitry operatively connected between the voltage source and the electro-optic shutter to apply a voltage differential to the shutter to place the shutter in either the transparent state or the opaque state; and the circuitry comprising a control that selectively switches the shutter between transparent and opaque states to enable a trainer to apply a training stimulus to an animal by interrupting the animal's vision.

10. The animal training apparatus of claim 9 wherein the electro-optic shutter comprises a liquid crystal.

11. The animal training apparatus of claim 9 wherein the attachment member comprises a hood adapted to fit over the head of the animal.

12. The animal training apparatus of claim 11 wherein the hood comprises a skullcap and a separate collar.

13. The animal training apparatus of claim 12 wherein the skullcap and the collar are connected by a strap.

14. The animal training apparatus of claim 9 comprising a housing, the voltage source comprising batteries in the housing.

15. The animal training apparatus of claim 9 wherein the attachment member comprises a flexible lens shroud housing the lens.

16. The animal training apparatus of claim 9 wherein the control comprises a remotely actuated switch to switch the shutter between transparent and opaque states and a remote control device spaced away from the animal to actuate the switch.

17. The animal training apparatus of claim 16 wherein the control comprises an antenna for receiving a signal transmitted from the remote control device, the control responsive to the signal to actuate the switch, and the remote control device is not physically connected to any of the other components of the animal training apparatus.

18. The animal training apparatus of claim 9 wherein the spectacles comprise a pair of lenses, each lens in the field of vision of a respective eye of the animal.

19. The animal training apparatus of claim 9 wherein the attachment member is adapted to hold the lens on one of a horse and a dog.

* * * * *